(12) United States Patent
Zhang et al.

(10) Patent No.: US 11,640,218 B2
(45) Date of Patent: May 2, 2023

(54) DISPLAY PANEL, DRIVING METHOD OF DISPLAY PANEL, AND DISPLAY DEVICE

(71) Applicant: Shanghai Tianma Micro-Electronics Co., Ltd., Shanghai (CN)

(72) Inventors: Jing Zhang, Shanghai (CN); Feng Lu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/672,514

(22) Filed: Feb. 15, 2022

(65) Prior Publication Data

US 2023/0031348 A1   Feb. 2, 2023

(30) Foreign Application Priority Data

Jul. 30, 2021   (CN) .......................... 202110874112.X

(51) Int. Cl.
G09G 3/00      (2006.01)
G06F 3/041     (2006.01)
G09G 3/20      (2006.01)

(52) U.S. Cl.
CPC ........ *G06F 3/0418* (2013.01); *G06F 3/04164* (2019.05); *G09G 3/20* (2013.01); *G09G 2330/12* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2020/0161406 A1* | 5/2020 | Lee ..................... | G01R 31/2837 |
| 2020/0175900 A1* | 6/2020 | Han ..................... | G06F 3/0446 |
| 2020/0175901 A1* | 6/2020 | Lee ..................... | G06F 3/04164 |
| 2020/0265783 A1* | 8/2020 | Lee ..................... | G09G 3/3266 |
| 2020/0278312 A1* | 9/2020 | Jeong ................... | G01N 27/20 |
| 2021/0096697 A1* | 4/2021 | Do ...................... | G06F 3/0448 |
| 2021/0367000 A1* | 11/2021 | Kim ..................... | H01L 27/323 |

* cited by examiner

*Primary Examiner* — Krishna P Neupane
(74) *Attorney, Agent, or Firm* — Anova Law Group PLLC

(57) ABSTRACT

A display panel, a driving method for a display panel, and a display device are provided. The display panel includes a functional component area, a display area at least partially surrounding the functional component area, a first non-display area between the functional component area and the display area, a second non-display area at least partially surrounding the display area, a touch-control electrode layer, and touch-control signal lines. The touch-control electrode layer includes a plurality of touch-control electrode blocks. The touch-control signal lines are electrically connected to the plurality of touch-control electrode blocks correspondingly. At least one touch-control signal line of the touch-control signal lines is multiplexed as crack detection lines. At least a portion of the crack detection lines is located in the first non-display area and surrounding the functional component area.

23 Claims, 10 Drawing Sheets

DISPLAY PANEL, DRIVING METHOD OF DISPLAY PANEL, AND DISPLAY DEVICE

CROSS-REFERENCE TO RELATED APPLICATION

This application claims the priority of Chinese Patent Application No. 202110874112.X, filed on Jul. 30, 2021, the content of which is incorporated herein by reference in its entirety.

TECHNICAL FIELD

The present disclosure generally relates to the field of electronic products and, more particularly, relates a display panel, a driving method of a display panel, and a display device.

BACKGROUND

To achieve a larger screen-to-body ratio, some display panels use in-screen digging technology, that is, an opening area for accommodating front cameras and other hardware is disposed in an effective display area. For example, an opening is cut in the display panel, and cameras or other devices originally located in a frame area are disposed into the opening, to reduce the frame. However, when an opening is cut on the display panel, cutting cracks may appear at the edges of the hole, and the extension of the cracks to the display area may affect the display effect of the display panel.

Therefore, there is a need for a new display panel, a driving method of the display panel, and a display device.

SUMMARY

One aspect of the present disclosure provides a display panel. The display panel includes a functional component area, a display area at least partially surrounding the functional component area, a first non-display area between the functional component area and the display area, a second non-display area at least partially surrounding the display area, a touch-control electrode layer, and touch-control signal lines. The touch-control electrode layer includes a plurality of touch-control electrode blocks. The touch-control signal lines are electrically connected to the plurality of touch-control electrode blocks correspondingly. At least one touch-control signal line of the touch-control signal lines is multiplexed as crack detection lines. At least a portion of the crack detection lines is located in the first non-display area and surrounding the functional component area.

Another aspect of the present disclosure provides a driving method for a display panel. The method includes: in a touch-control stage, sending touch-control signals to touch-control electrode blocks through touch-control signal lines; in a crack detection stage, sending crack detection signals to the touch-control electrode blocks and receiving feedback signals through crack detection lines formed by multiplexing at least one of the touch-control signal lines; and when difference between the feedback signals and a reference signal value is larger than an error range, outputting warning signals.

Another aspect of the present disclosure provides a display device. The display device includes a display panel. The display panel includes a functional component area, a display area at least partially surrounding the functional component area, a first non-display area between the functional component area and the display area, a second non-display area at least partially surrounding the display area, a touch-control electrode layer, and touch-control signal lines. The touch-control electrode layer includes a plurality of touch-control electrode blocks. The touch-control signal lines are electrically connected to the plurality of touch-control electrode blocks correspondingly. At least one touch-control signal line of the touch-control signal lines is multiplexed as crack detection lines. At least a portion of the crack detection lines is located in the first non-display area and surrounding the functional component area.

In the present disclosure, the display panel may include the touch-control electrode layer and the touch-control signal lines. The touch-control signal may be transmitted to each of the plurality of touch-control electrode blocks through the touch-control signal lines to realize the touch-control function of the display panel. At the same time, at least one of the touch-control signal lines may be multiplexed as the crack detection lines, and the crack detection lines may be at least partially located in the first non-display area and arranged around the functional component area. When cracks occur in the functional component area, the crack detection lines will be damaged or even broken due to cracks, which will cause the resistance of the crack detection lines to change and cause signal transmission problems. Signals transmitted through the crack detection line or changes of parameters of one of the plurality of touch-control electrode blocks connected to the crack detection line may be detected to determine whether the cracks are generated, and can effectively screen out defective products with cracks. The display panel provided by the embodiment of the present disclosure may realize the touch-control function and the crack detection function of the display panel by multiplexing at least one of the touch-control signal lines as the crack detection lines. Additional wiring for crack detection may be avoided to reduce the influence of the crack detection lines on the touch-control signals. The integration level and space utilization of the display panel may be improved at the same time.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
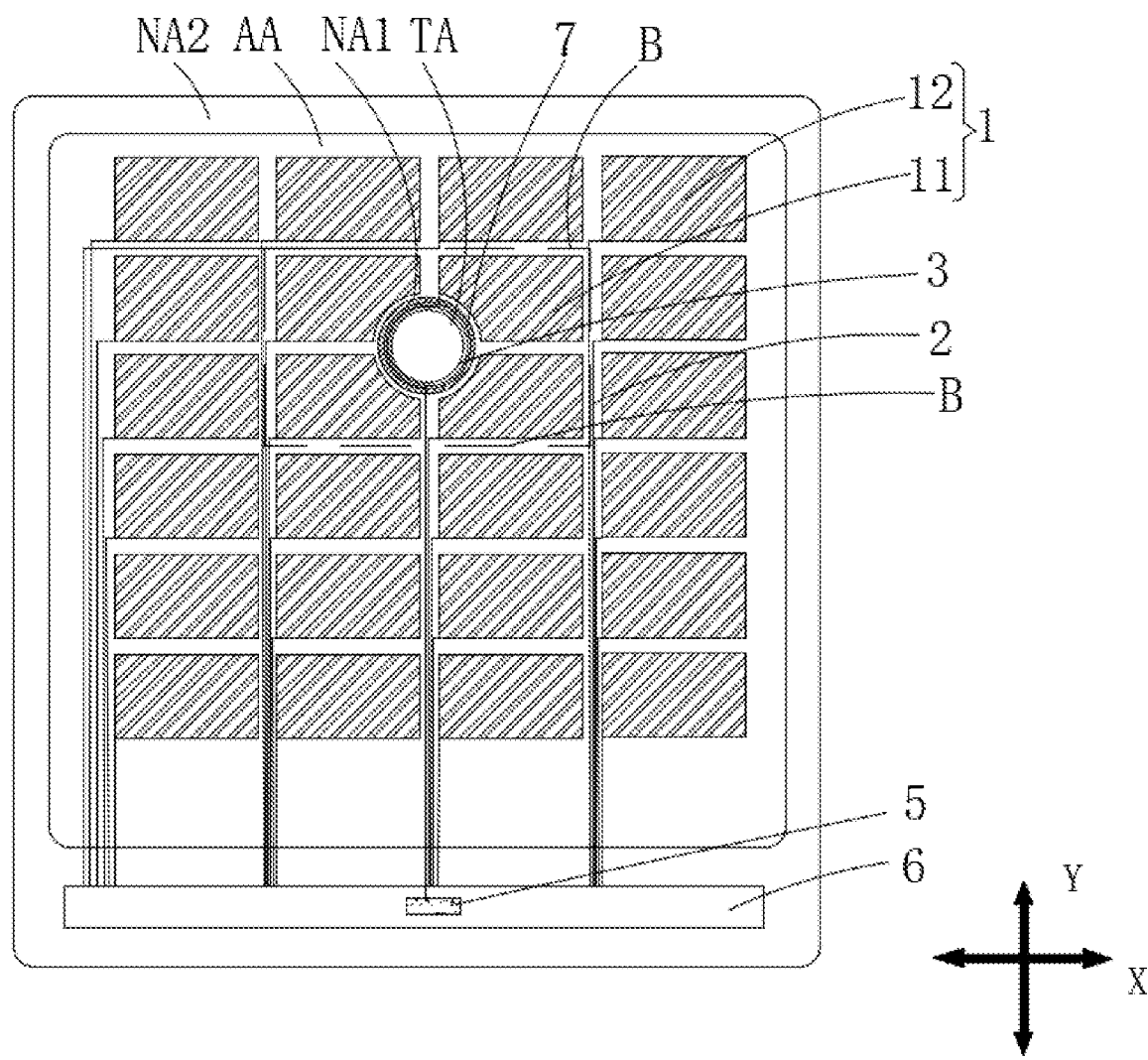
FIG. 1 illustrates an exemplary display panel consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In various embodiments of the present disclosure, a display panel may be an organic light-emitting diode (OLED) display panel, a liquid crystal display panel, or a micro-plane display panel (a micro-OLED display panel or a micro-LED display panel).

Figure 2:
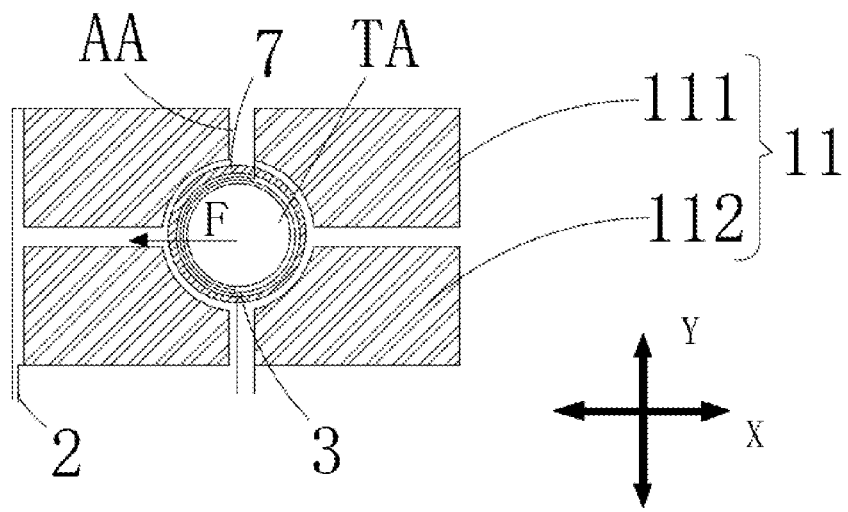
FIG. 2 illustrates an exemplary enlarged schematic of section B in FIG. 1.
Figure 3:
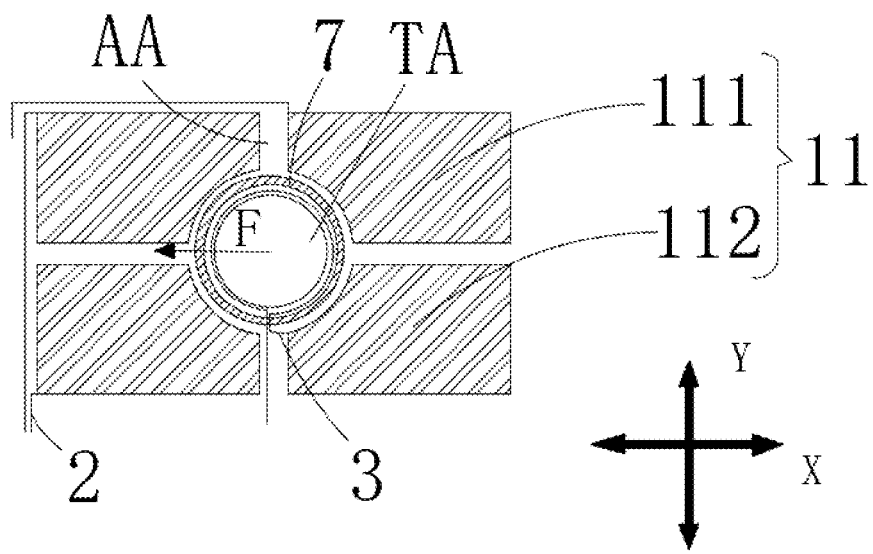
FIG. 3 illustrates another exemplary enlarged schematic of section B in FIG. 1.
Figure 4:
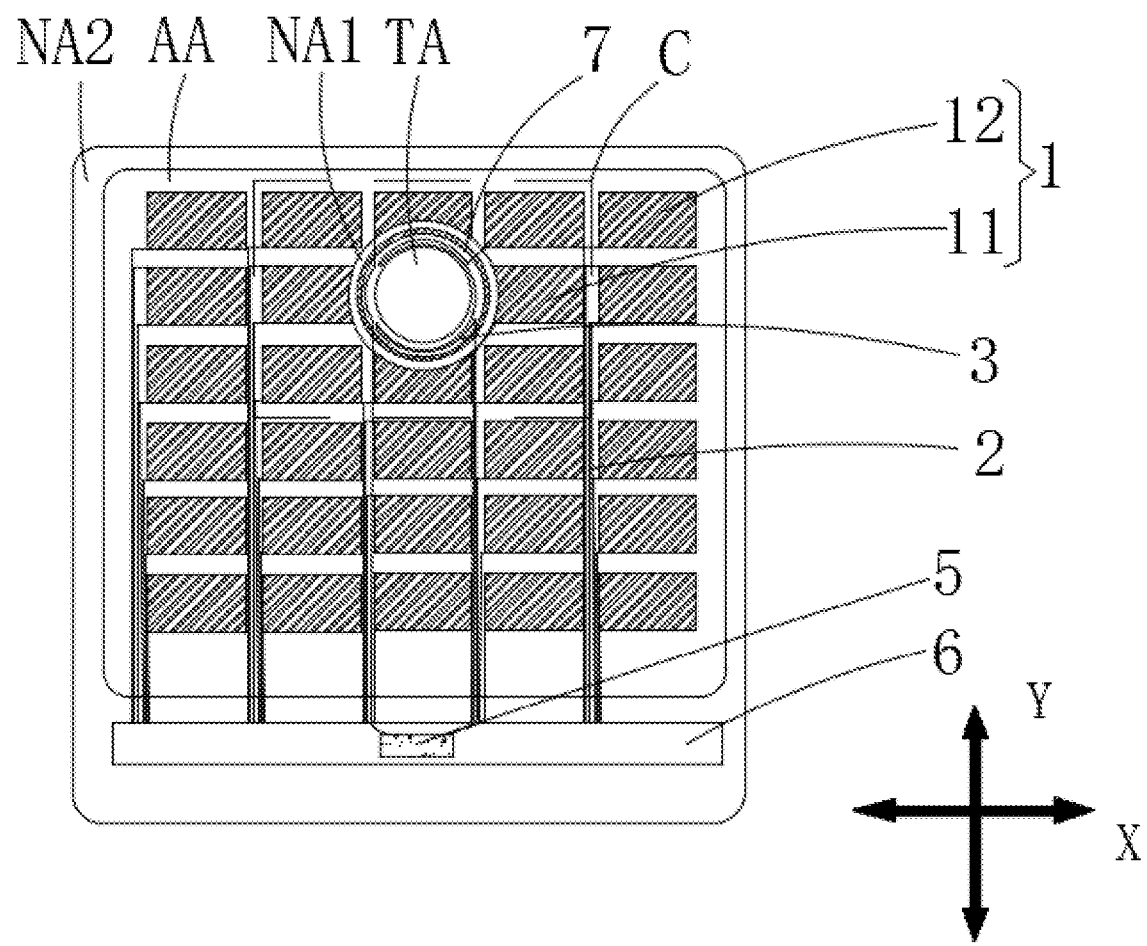
FIG. 4 illustrates another exemplary display panel consistent with various disclosed embodiments in the present disclosure.

One embodiment of the present disclosure provides a display panel. As illustrated in FIG. 1 to FIG. 3, the display panel may include a functional component area TA, a display AA at least partially surrounding the functional component area TA, a first non-display area NA1 disposed between the functional component area TA and the display area AA, and a second non-display area NA2 at least partially surrounding the display area AA. The display panel may consist of a touch-control electrode layer including a plurality of touch-control electrode blocks 1, and touch-control signal lines 2 connected to the plurality of touch-control electrode blocks 1 correspondingly. At least one of the touch-control signal lines 2 may be multiplexed as a crack detection line 3. At least a part of the crack detection line 3 may be disposed in the first non-display area NA1 surrounding the functional component area TA. In the present disclosure, the display panel may include the touch-control electrode layer and the touch-control signal lines 2. The touch-control signal may be transmitted to each of the plurality of touch-control electrode blocks 1 through the touch-control signal lines 2 to realize the touch-control function of the display panel. At the same time, at least one of the touch-control signal lines 2 may be multiplexed as the crack detection line 3, and the crack detection line 3 may be at least partially located in the first non-display area NA1 and arranged around the functional component area TA. When cracks occur in the functional component area TA, the crack detection line 3 will be damaged or even broken due to cracks, which will cause the resistance of the crack detection line 3 to change and cause signal transmission problems. Signals transmitted through the crack detection line 3 or changes of parameters of one of the plurality of touch-control electrode blocks 1 connected to the crack detection line 3 may be detected to determine whether the cracks are generated, and can effectively screen out defective products with cracks. The display panel provided by the embodiment of the present disclosure may realize the touch-control function and the crack detection function of the display panel by multiplexing at least one of the touch-control signal lines 2 as the crack detection line 3. Additional wiring for crack detection may be avoided to reduce the influence of the crack detection line 3 on the touch-control signals. The integration level and space utilization of the display panel may be improved at the same time.

The display area AA may be at least partially arranged around the functional component area TA. The functional component area TA may be a hollow area or a hole area. The touch-control electrode layer and at least part of a display device layer 9 may be hollowed out. Specifically, the display device layer 9 may include an encapsulation layer, a light-emitting layer, and an array layer stacked in a thickness direction of the display panel. The hollow holes may be at least hollowed out in the encapsulation layer, the light-emitting layer, and an inorganic film layer in the array layer (such as a gate insulating layer) in the functional component area TA, to improve the light transmittance of the functional part area TA. The hollow holes may extend to a substrate 8, and the substrate 8 may be made of transparent PI (Polyimide Film, polyimide) to further improve the light transmittance of the functional component area TA. The hollow holes can also penetrate through the substrate 8, such that optical elements, such as a camera, a fingerprint recognition sensor, etc., can be arranged in the corresponding functional component area TA.

The display area AA may be arranged around the entire functional part area TA, or may be arranged partly around the functional part area TA, to form a notch display screen, namely a notch screen or a water drop screen. It should be noted that, in some optional embodiments, the functional component area TA may also be a high light transmittance display area AA including display elements.

Optionally, the crack detection line 3 can be arranged partly around the functional part area TA, or can be arranged around the entire functional part area TA. When the crack detection line 3 is arranged completely around the entire functional part area TA, whether cracks are generated in all directions of the functional part area TA can be detected, effectively improving the detection range of cracks.

In some embodiments of the present disclosure, each of the touch-control signal lines 2 may be a connecting line connecting corresponding two touch-control electrode blocks 1 of the plurality touch-control electrode blocks 1 to electrically connect the corresponding two touch-control electrode blocks 1 separated by the functional component area TA. Optionally, the touch-control structure may be a mutual capacitive touch-control structure (not shown in the figure), and one touch-control electrode block 1 of the plurality touch-control electrode blocks 1 may include a touch-control drive electrode and a touch-control sensing electrode that are insulated from each other. A control chip 6 may send a touch-control drive signal to the touch-control drive electrode in the touch-control electrode block 1 through one touch-control signal line 2, and transmit a touch-control sensing signal generated by the touch-control sensing electrode that forms a mutual capacitance electrode pair with the touch-control drive electrode back to the control chip 6 through another touch-control signal line 2. The touch-control drive electrodes located in a same row or a same column need to be electrically connected, and the touch-control sensing electrodes located in a same row or a same column need to be electrically connected. Correspondingly, when the control drive electrodes in the same row or column are separated into two touch-control drive electrodes by the functional component area TA, or when the touch-control sensing electrodes in the same row or column are separated into two touch-control sensing electrodes by the functional component area TA, each touch-control signal line 2 may be used as a connecting line to connect two separated touch-control driving electrodes or touch-control sensing electrodes.

In the mutual-capacitive touch-control structure, a touch-control position may be determined by detecting the capacitance change between the touch-control driving electrodes and the touch-control sensing electrodes. The touch-control signal lines 2 electrically connected to the touch-control sensing electrodes or the touch-control signal lines 2 electrically connected to the touch-control driving electrodes can be multiplexed into the crack detection line 3 to improve the integration level of the display panel. When the touch-control structure is a mutual capacitive touch-control structure, the plurality of touch-control electrode blocks 1 and the touch-control signal lines 2 may be arranged in different layers. An insulating layer may be arranged between the plurality of touch-control electrode blocks 1 and the touch-control signal lines 2, and the touch-control signal lines 2 may be electrically connected to the plurality of touch-control electrode blocks 1 via through holes.

In some embodiments of the present disclosure, the touch-control signal lines 2 and the plurality of touch-control electrode blocks 1 may be connected in a one-to-one correspondence.

In some other embodiments, optionally, as shown in FIG. 1, the touch-control structure may be a self-capacitance touch-control structure, that is, each of the plurality of touch-control electrode blocks 1 may be connected to a control module (such as the control chip 6) through one corresponding touch-control signal line 2. The touch-control signal lines 2 may be configured to transmit the touch-control driving signals sent by the control chip 6 to each of the plurality of touch-control electrode blocks 1. One same touch-control signal line 2 may be used to transmit the touch-control sensing signal generated by the corresponding touch-control electrode block 1 back to the control chip 6.

In the self-capacitance touch-control structure, the touch-control signal lines 2 and the plurality of touch-control electrode blocks 1 may be disposed in a same layer. When the touch-control signal lines 2 and the plurality of touch-control electrode blocks 1 are disposed in a same layer, the touch-control signal lines 2 may be needed to use intervals between the plurality of touch-control electrode blocks 1 for wiring. Because of being hindered by the functional component area TA, there may be a problem that the touch-control signal lines 2 corresponding to a portion of the plurality of touch-control electrode blocks 1 require space to be arranged.

In the embodiment of the present disclosure, through the design of multiplexing at least one of the touch-control signal line 2 as the crack detection line 3, the crack detection line 3 can extend to the first non-display area NA1, and be electrically connected to the control chip 6 bypassing the functional component area TA. The crack detection function of the display panel can be achieved while solving the wiring problem of this part of the touch-control signal lines 2.

Because of the different sensing methods, the touch-control signal lines 2 multiplexed as the crack detection line 3 between the plurality of touch-control electrode blocks 1 in the self-capacitive touch-control structure may have less impact on touch-control detection. Because the self-capacitive touch-control structure does not detect the touch-control position through the change of the fringe electric field between the touch-control driving electrodes and the touch-control sensing electrodes, the influence of a signal line used to transmit a signal to the crack detection line 3 which is disposed in the interval between the plurality of touch-control electrode blocks 1 on the touch-control electrodes can be reduced, such that the touch-control detection accuracy of the display panel will not be affected. At the same time of achieving both the touch-control function and crack detection functions, the number of conductive layers can be reduced, and the thinning of the display panel can be realized.

Of course, in some other optional embodiments of the present disclosure, the plurality of touch-control electrode blocks 1 may be made of opaque metal with low resistivity, including copper, aluminum, or a combination thereof, to ensure the touch-control effect.

As shown in FIG. 1 to FIG. 3, in some embodiments, to reduce a wiring distance of the at least one touch-control signal line 2 multiplexed as the crack detection line 3 and avoid interference between the at least one touch-control signal line 2 multiplexed as the crack detection line 3 and other touch-control signal lines 2, the plurality of touch-control electrode blocks 1 may include a plurality of first touch-control electrode blocks 11. At least one edge of each of the plurality of first touch-control electrode blocks 11 may be disposed adjacent to the functional component area TA. At least one touch-control signal line 2 of the touch-control signal lines 2 electrically connected to the plurality of first touch-control electrode blocks 11 may be multiplexed as the crack detection line 3.

It should be understood that the plurality of first touch-control electrode blocks 11 may be a portion of the plurality of touch-control electrode blocks 1 adjacent to the functional component area TA. Since the plurality of first touch-control electrode blocks 11 may be closer to the functional component area TA than other touch-control electrode blocks 1 of the plurality of touch-control electrode blocks 1, the touch-control signal lines 2 extending from the plurality of first touch-control electrode block 11 can directly enter the first non-display area NA1 to be arranged around the functional component area TA and may not need to pass through other touch-control electrode blocks 1, effectively avoiding the interference between the crack detection line 3 and other touch-control electrode blocks 1 or touch-control signal lines 2 and facilitating wiring.

As shown in FIG. 1, to achieve the crack detection function of the display panel, the display panel may further include a crack detection circuit. The crack detection circuit may include a crack detection component 5 and the crack detection line 3 electrically connected to the crack detection component 5. The crack detection component 5 may be disposed in the second non-display area NA2.

When the crack detection line 3 is damaged due to cracks, its resistance may change and further cause the voltage signal or current signal transmitted by the crack detection line 3 to change. The signal change of the crack detection line 3 can be detected synchronously by the crack detection component 5 to determine whether the functional component area TA of the display panel has cracks, and the defective products with cracks can be effectively screened out. Further, to prevent the crack detection component 5 from affecting the normal display of the display panel, the crack detection component 5 may be arranged in the second non-display area NA2. The crack detection component 5 may specifically be a detection pad or another detection circuit capable of detecting parameters such as capacitance or voltage.

When the touch-control signal lines 2 and the touch-control electrode layer are disposed in a same layer, the touch-control signal lines 2 may use intervals between each of the plurality of touch-control electrode blocks 1 for wiring. Hindered by the functional component area TA, the touch-control signal lines 2 of a portion of the plurality of first touch-control electrode blocks 11 may be difficult to wire.

As shown in FIG. 1 and FIG. 2, to resolve above problems, in one embodiment, the display panel may further include the control chip 6. The control chip 6 may be disposed at a side of a first direction Y of the functional component area TA, and may be located in the second non-display region. Each of the touch-control signal lines 2 may be electrically connected to the control chip 6. In the first direction Y, the plurality of first touch-control electrode blocks 11 may include first A touch-control electrode blocks 111 disposed at a side of the functional component area TA away from the control chip 6. At least one touch-control signal line 2 electrically connected to the first A touch-control electrode blocks 111 may be multiplexed as the crack detection line 3.

It should be noted that the control chip 6 may be used to send touch-control signals to a corresponding one of the plurality of touch-control electrode blocks 1 through each touch-control signal line 2, and the crack detection component 5 may be integrated in the control chip 6 to reduce the occupied space and improve the integration level of the display panel. In some other embodiment, the crack detection part 5 can also be arranged separately to avoid interference with the touch-control signals. Since the first A touch-control electrode blocks 111 may be disposed on the side of the functional component area TA away from the control chip 6, and the connection between the touch-control signal lines 2 electrically connected to the first A touch-control electrode blocks 111 and the control chip 6 may be obstructed by the functional component area TA, the at least one of the touch-control signal lines 2 electrically connected to the first A touch-control electrode blocks 111 may be multiplexed as the crack detection line 3. The crack detection line 3 can extend to the first non-display area NA1, and be electrically connected to the control chip 6 bypassing the functional component area. The wiring problem of the first A touch-control electrode blocks 111 may be resolved while realizing the display panel crack detection function.

Optionally, in some other embodiments, the control chip 6 can be used to realize the crack detection function of the display panel, and there may be no need to additionally provide the crack detection component 5. Specifically, the control chip 6 can detect the change in the capacitance of the plurality of touch-control electrode blocks 1 connected to the crack detection line 3 to determine whether cracks occur. For example, when the difference between the current voltage value of the plurality of touch-control electrode blocks 1 received by the control chip 6 and the preset value is larger than a maximum deviation value, it may be determined that a crack occurs.

Since the first A touch-control electrode blocks 111 may be located on the side of the functional component area TA away from the control chip 6, when one crack detection line 3 is used, it may be necessary to set the crack detection line 3 more than one circle around the functional component area TA to make the crack detection line 3 arrive at the outlet position, which increases the trace length of the crack detection line 3, affects the transmission of touch-control signals, and further affects the uniformity of touch. To avoid the above problem, optionally, the two touch-control signal lines 2 electrically connected to the first A touch-control electrode blocks 111 may be multiplexed as two crack detection lines 3, and the two crack detection lines 3 may be disposed symmetrically with respect to the functional component area TA in a second direction X, such that the two crack detection lines 3 form a complete ring structure surrounding the entire functional component area TA to increase the detection range of the cracks. The second direction X and the first direction Y may be perpendicular to each other. Of course, in some other embodiments, more than two touch-control signal lines 2 electrically connected to the first A touch-control electrode blocks 111 may be multiplexed as the crack detection lines 3, and there is no special limitation.

As shown in FIG. 1 to FIG. 3, to further improve the uniformity of the touch-control of the display panel, in one embodiment, the display panel may further include the control chip 6. The control chip 6 may be disposed at a side of a first direction Y of the functional component area TA. Each of the touch-control signal lines 2 may be electrically connected to the control chip 6. In the first direction Y, the plurality of first touch-control electrode blocks 11 may include first B touch-control electrode blocks 112 disposed at a side of the functional component area TA close to the control chip 6. At least one touch-control signal line 2 electrically connected to the first B touch-control electrode blocks 112 may be multiplexed as the crack detection line 3.

It can be understood that the first B touch-control electrode blocks 112 may be arranged on the side of the functional component area TA that is close to the control chip 6, that is, the first B touch-control electrode blocks 112 may be relatively close to the control chip 6. When the touch-control signal lines of the first B touch-control electrode blocks 112 directly extend toward the control chip 6 and are electrically connected to the control chip 6, the touch-control signal lines of the first B touch-control electrode blocks 112 may be shorter than the touch-control signal lines 2 of the other of the plurality of first touch-control electrode blocks 11. Multiplexing the at least one touch-control signal line 2 electrically connected to the first B touch-control electrode blocks 112 as the crack detection line 3 can effectively compensate the signal loading caused by the difference in the length of the trace, and improve the touch-control uniformity of the display panel.

As shown in FIG. 1 to FIG. 3, in some embodiments, a quantity of the plurality of first touch-control electrode blocks 11 may be smaller than or equal to 4, and one touch-control signal line 2 of the touch-control signal lines 2 may be multiplexed as the crack detection line 3. Specifically, when the size and area of the functional component area TA is relatively small, the number of the plurality of first touch-control electrode blocks 11 surrounding the functional component area TA may also be small correspondingly. When the outer edge circumference of the functional component area TA is relatively small, the winding length of the required crack detection line 3 may be relatively small and the crack detection function can be realized by only one touch-control signal line 2.

As shown in FIG. 4 to FIG. 11, in some other embodiments, a quantity of the plurality of first touch-control electrode blocks 11 may be larger than 4, and at least two touch-control signal lines 2 of the touch-control signal lines 2 may be multiplexed as the crack detection lines 3. Specifically, since the number of the plurality of first touch-control electrode blocks 11 may be large and the size and area of the functional component area TA surrounded by the plurality of first touch-control electrode blocks 11 may be large correspondingly, a plurality of crack detection lines 3 may be disposed to cooperate with each other to surround the entire functional component area TA, ensuring the crack detection range.

As shown in FIG. 2 and FIG. 3, when one crack detection line 3 is used, incoming and outgoing positions of the crack detection line 3 in the first non-display area NA1 usually may not be at the same position. To make the crack detection line 3 surround the entire functional component area TA for ensuring the crack detection range, in some optional embodiments, the crack detection line 3 may loop for at least two circles in a direction F that radiates to the display area AA from the center of the functional component area TA.

It should be noted that looping for at least two circles does not refer to two completely closed rings, but non-closed circles. Specifically, in a part of the outer peripheral side of the functional component area TA, the crack detection line 3 may loop for two circles, and it does not mean that the entire outer peripheral side of the functional component area TA is surrounded by two circles of the crack detection line 3.

Figure 5:
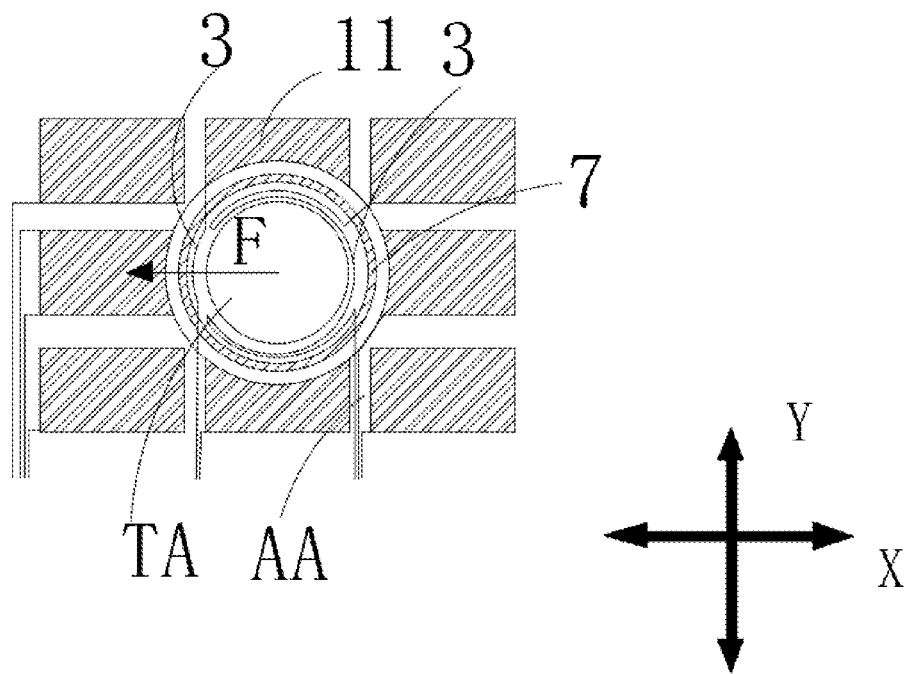
FIG. 5 illustrates an exemplary enlarged schematic of section C in FIG. 4.

As shown in FIG. 5, in some embodiments, the plurality of crack detection lines 3 may be adopted. To avoid interference between each of the plurality of crack detection lines 3 which could affect the accuracy of the crack position detection, at least two touch-control signal lines 2 of the touch-control signal lines 2 may be multiplexed as the crack detection lines 3, and two adjacent crack detection lines 3 of the plurality of crack detection lines 3 may not overlap each other along the direction F radiating to the display area AA from the center of the functional component area TA.

It can be understood that the two adjacent crack detection lines 3 do not overlap in the direction F radiating to the display area AA from the center of the functional component area TA, may specifically mean that each of the plurality of crack detection lines 3 may be disposed respectively to surround a corresponding portion of the functional component area TA without interfering with each other. Each crack detection line 3 may be configured to realize the crack detection of the corresponding portion of the functional component area TA. When a crack occurs in the functional component area TA, the position of the crack can be roughly determined according to which crack detection line 3 detects the crack, improving the efficiency of crack detection.

Figure 6:
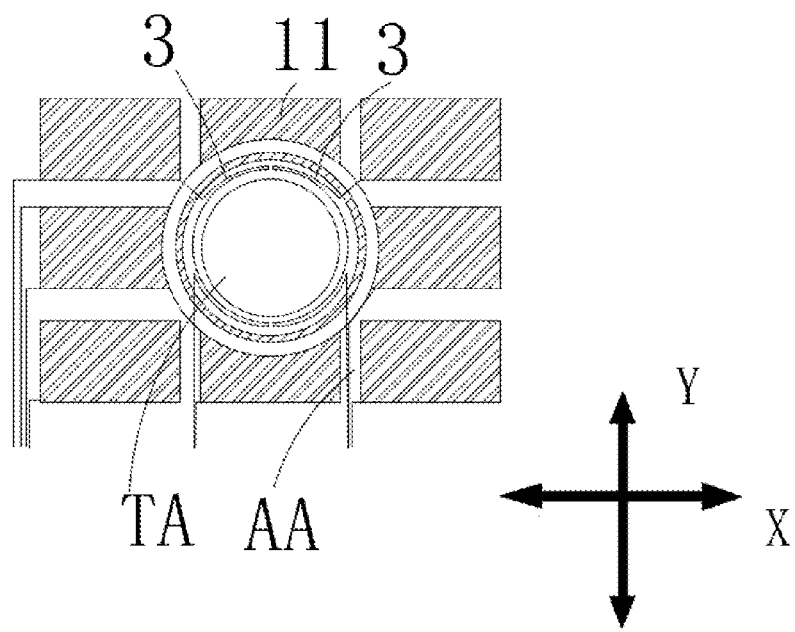
FIG. 6 illustrates another exemplary enlarged schematic of the section C in FIG. 4.

As shown in FIG. 6, in some embodiments, the number of the plurality of crack detection lines 3 may be larger than or equal to 2, and the plurality of crack detection lines 3 may be disposed symmetrically with respect to the center of the functional component area TA.

The number of the plurality of crack detection lines 3 can be even or odd. When the number of the plurality of crack detection lines 3 is an even number such as 2 or 4, each of the plurality of crack detection lines 3 may be distributed symmetrically with respect to the center of the functional component area TA. When the number of the plurality of crack detection lines 3 is an odd number such as three, five, etc., the overall pattern formed by each of the plurality of crack inspection lines 3 may be distributed symmetrically with respect to the center of the functional component area TA. When the plurality of crack detection lines 3 are distributed symmetrically about the center of the function component area TA, interference between each other may be reduced effectively, and the position of the crack can be roughly determined according to which crack detection line 3 detects the crack, improving the efficiency of crack detection.

Figure 7:
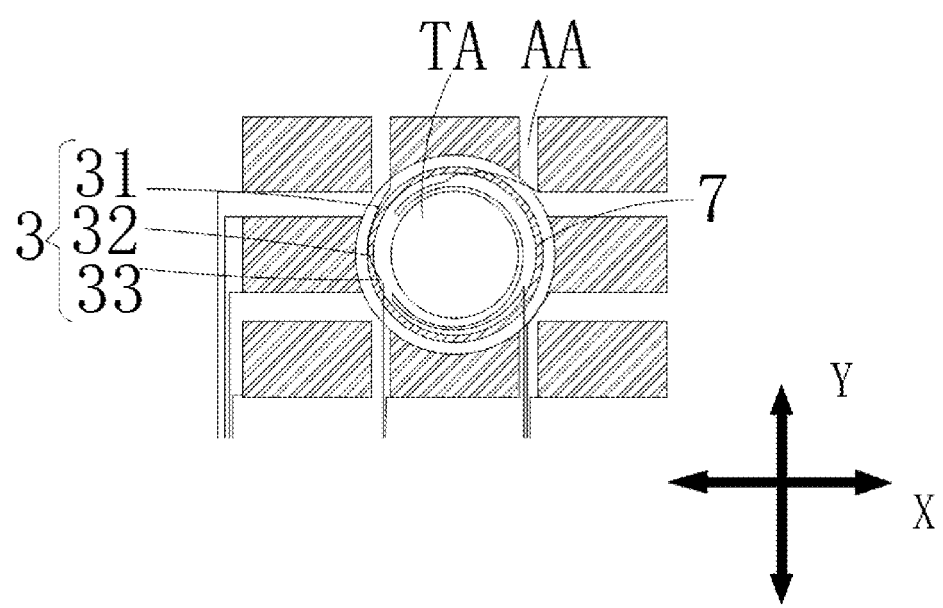
FIG. 7 illustrates another exemplary enlarged schematic of the section C in FIG. 4.

As shown in FIG. 5 to FIG. 7, in some embodiments, a dam part 7 may be disposed in the first non-display area NA1 and surround the functional component area TA. At least a portion of the crack detection line 3 may be located between the dam part 7 and the functional component area TA.

External water vapor can easily enter the display panel through the functional component area TA, which will corrode other components of the display panel and affect the service life of the display panel. Therefore, in this embodiment, a dam part 7 surrounding the functional component area TA may be provided. The dam part 7 may prevent water and oxygen from entering the display area AA of the display panel. The at least one touch-control signal line 2 multiplexed as the crack detection line 3 may need to cross the dam part 7 and enter a region between the dam part 7 and the functional component area TA, such that the crack detection line 3 may be closer to the functional component area TA. The sensitivity of crack detection may be improved and the accuracy of crack detection may be ensured.

As shown in FIG. 7, to reduce the risk of disconnection of the crack detection line 3, in some optional embodiments, the crack detection line 3 may include a first detection section 31, a second detection section 32, and a third detection section 33 that are connected to each other. The first detection section 31 may be disposed at a side of the dam part 7 away from the functional component area TA and may be partly tangent to the outer edge of the dam part 7. The second detection section 32 may pass through the dam part 7. The third detection section 33 may be disposed at another side of the dam part 7 close to the functional component area TA, and may be partially tangent to the inner edge of the dam part 7.

It can be understood that the first detection section 31 may be a part of the crack detection line 3 between the plurality of touch-control electrode blocks 1 and the dam part 7. One end of the first detection section 31 may extend from the plurality of touch-control electrode blocks 1, and the other end may be partly tangent to the outer edge of the dam part 7, to prevent the first detection section 31 from entering the dam part 7 in a direction perpendicular to the outer edge of the dam part 7. The second detection section 32 may cross the dam part 7, and the third detection section 33 may be a part of the crack detection line 3 between the dam part 7 and the functional component area TA. The third detection section 33 may be partly tangent to the inner edge of the dam section 7 and the second detection section 32 may extend along the inner edge of the dam part 7 to form the third detection section 33. Correspondingly, the bending angle of the crack detection line 3 may be effectively reduced, the risk of disconnection of the crack detection line 3 may be reduced, and the crack detection effect of the display panel may be ensured.

Since the second detection section 32 needs to cross the dam part 7, and a wiring manner such as climbing may be needed to cross the film layers of the dam part 7 with a step difference, the risk of disconnection may be relatively large. To avoid disconnection in the second detection section 32, in some optional embodiments, the line width of the second detection section 32 may be larger than the line widths of the first detection section 31 and the third detection section 33. It can be understood that setting the line width of the second detection section 32 to be larger can effectively increase the strength of the second detection section 32 and reduce the possibility of disconnection of the second detection section 32.

Figure 8:
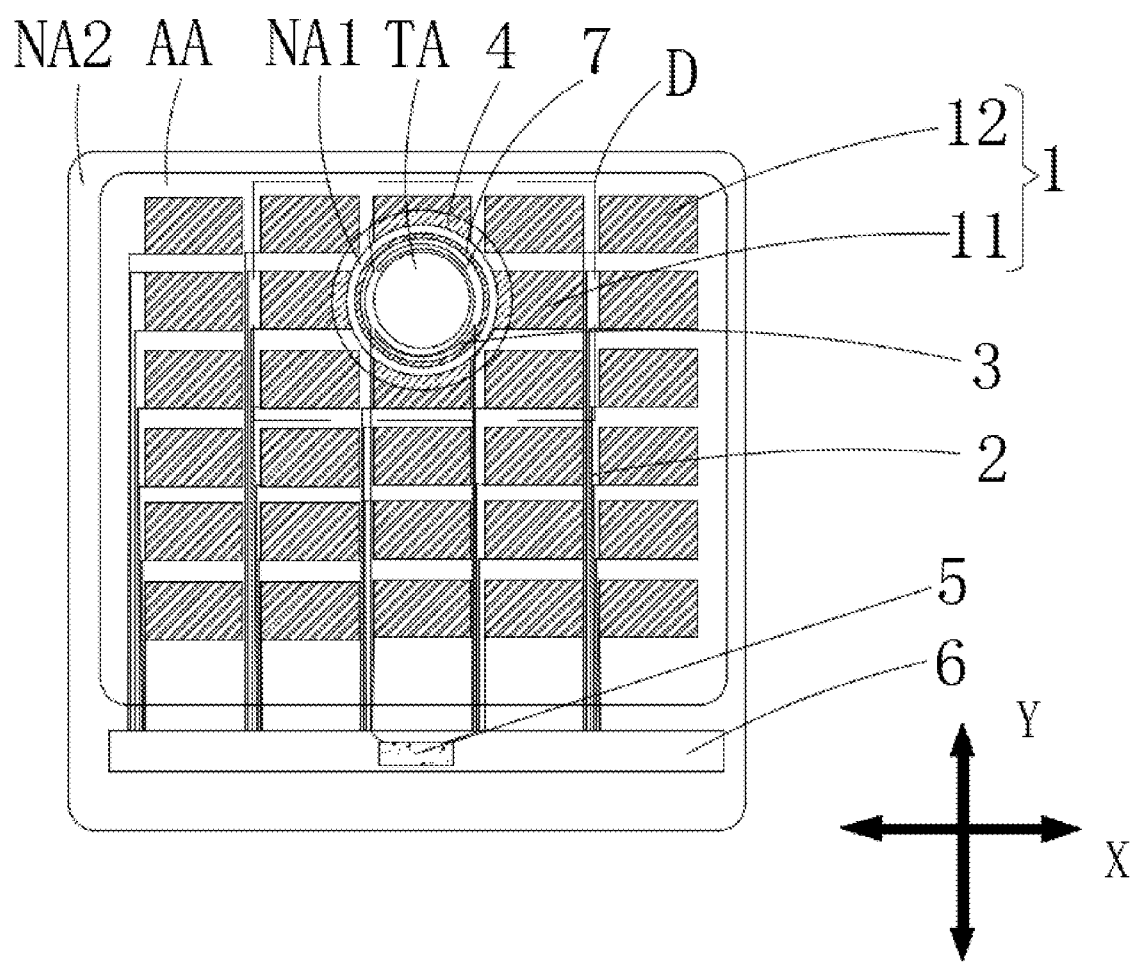
FIG. 8 illustrates another exemplary display panel consistent with various disclosed embodiments in the present disclosure.

As shown in FIG. 8, because of the functional component area TA, in each of the plurality of first touch-control electrode blocks 11 compared to other touch-control electrode blocks 1 of the plurality of touch-control electrode blocks 1, a part may be missing, affecting the amplitude of the touch-control capacitance. To compensate for this part of the touch-control capacitance, in some optional embodiments, the display panel may further include a plurality of touch-control compensation blocks 4 arranged at intervals between the dam part 7 and the plurality of first touch-control electrode blocks 11, and each of the plurality of control compensation blocks 4 may be electrically connected to the adjacent one of the plurality of first touch-control electrode blocks 11 respectively.

Each of the plurality of control compensation blocks 4 may be electrically connected to the adjacent one of the plurality of first touch-control electrode blocks 11 respectively, to compensate for the missing part of the touch-control capacitance in the adjacent one of the plurality of first touch-control electrode blocks 11. Each of the plurality of control compensation blocks 4 may be disposed at an interval from each other, to avoid the signal interference between each other and avoid the reducing of the touch-control performance. The size and area of each of the plurality of control compensation blocks 4 may be different and can be configured according to the amplitude of the missing part of the touch-control capacitance in the adjacent one of the plurality of first touch-control electrode blocks 11.

Figure 9:
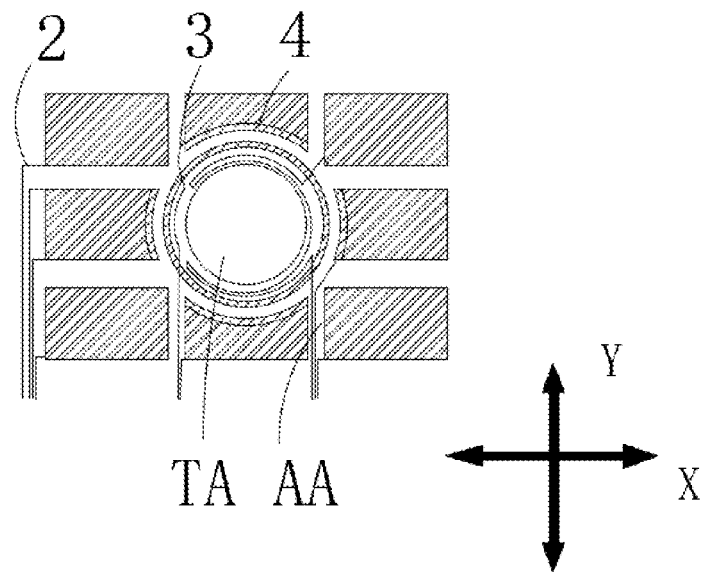
FIG. 9 illustrates an exemplary enlarged schematic of a section D in FIG. 8.

Referring to FIG. 9, in some optional embodiments, at least one touch-control signal line 2 may extend toward the functional component area TA through the intervals between the plurality of touch-control compensation blocks, 4 to form the crack detection line 3. Since the touch-control signal lines 2 and the plurality of touch-control compensation blocks 4 are arranged in the same layer, the at least one touch-control signal line 2 may need to be routed into the first non-display area NA1 by using the intervals between the plurality of touch-control compensation blocks 4 to form the crack detection line 3, to avoid contact between the touch-control signal lines 2 and different touch-control compensation blocks 4 of the plurality of touch-control compensation blocks 4. Signal interference may be avoided and affecting on the crack detection and touch-control functions may be reduced.

Figure 10:
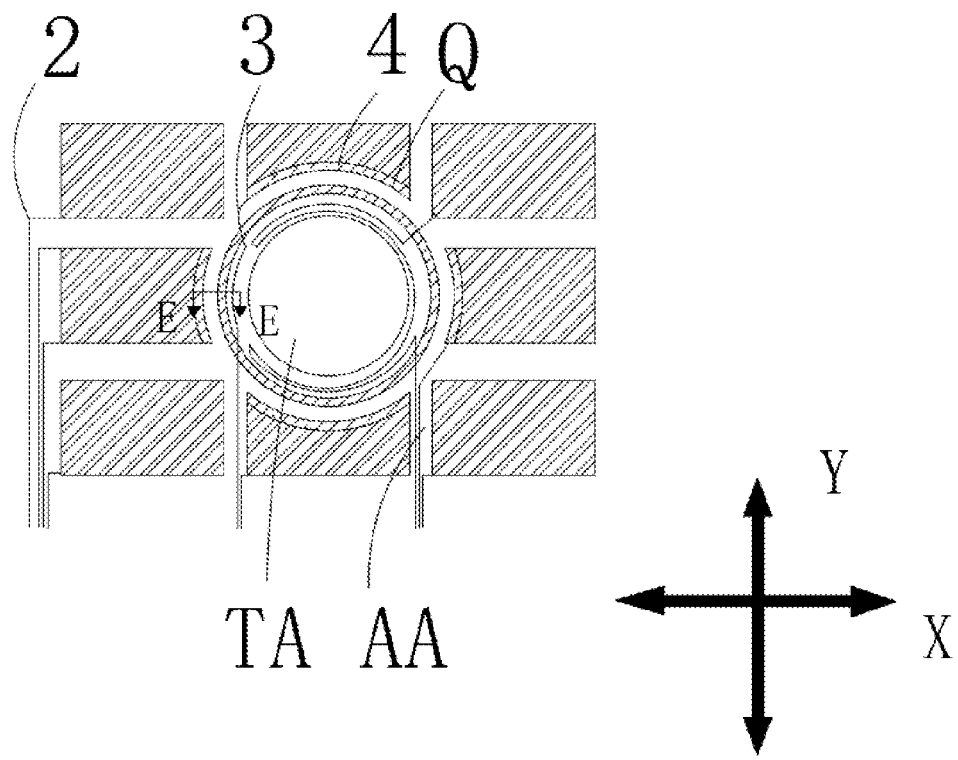
FIG. 10 illustrates another exemplary enlarged schematic of the section D in FIG. 8.

Referring to FIG. 10, to avoid contact between the at least one touch-control signal line 2 and the plurality of touch-control compensation blocks 4 when the at least one touch-control signal line 2 passes through the intervals between the plurality of touch-control compensation blocks 4, in some optional embodiments, the at least one touch-control signal line 2 may extend in a direction from the plurality of touch-control compensation blocks 4 to the functional component area TA to form the crack detection line 3.

Since each touch-control compensation block 4 of the plurality of touch-control compensation blocks 4 may be electrically connected to the adjacent first touch-control electrode block 11 of the plurality of first touch-control electrode blocks 11, the touch-control signal lines 2 can also send touch-control signals to the plurality of first touch-control electrode blocks 11 through the plurality of touch-control compensation blocks 4. That is, one touch-control compensation block 4 of the plurality of touch-control compensation blocks 4 and a corresponding one of the plurality of the first touch-control electrode blocks 11 electrically connected to the touch-control compensation block 4 may receive the same touch-control signals. The at least one touch-control signal line 2 may extend in the direction from the plurality of touch-control compensation blocks 4 to the functional component area TA to form the crack detection line 3. There may be unnecessary to pass through the intervals between the plurality of touch-control compensation blocks 4, which reduces the wiring length and effectively avoids interference between the touch-control signal lines 2 and the plurality of touch-control compensation blocks 4.

As shown in FIG. 10, in some optional embodiments, each of the plurality of touch-control compensation blocks 4 may have a curved edge Q facing the functional component area TA, and the at least one touch-control signal line 2 may extend from the extension line of the curved edge Q to the functional component area TA, to form the crack detection line 3.

It can be understood that the crack detection line 3 may extend along the extension line of the curved edge Q, which can effectively reduce the risk of the crack detection line 3 being broken at the outlet positions of the plurality of touch-control compensation blocks 4. Optionally, the arc of the curved edge Q may be the same as the arc of the outer edge of the opposite functional component area TA, to ensure the touchable areas of the plurality of touch-control compensation blocks 4 on the outer peripheral side of the functional component area TA.

Figure 11:
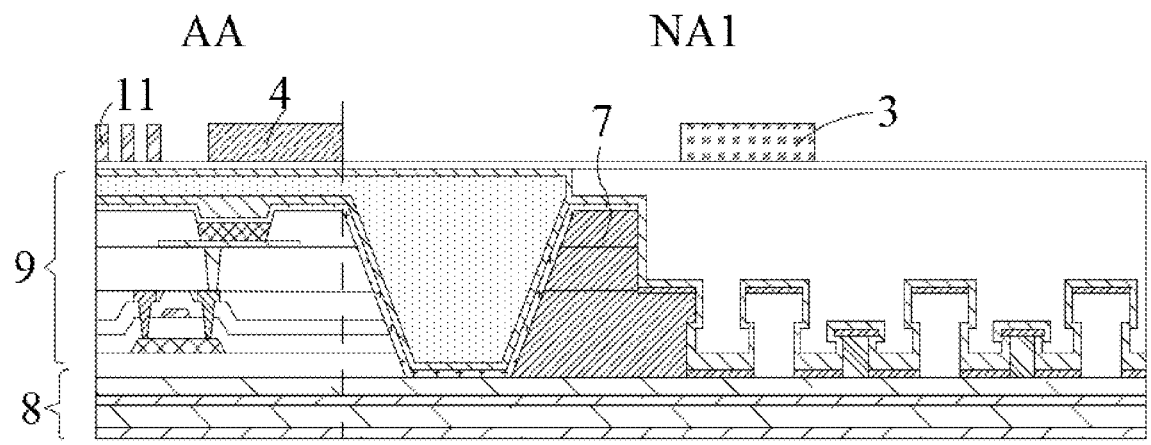
FIG. 11 illustrates an exemplary film layer structure along E-E direction in FIG. 10.

As shown in FIG. 11, in some embodiments, to compensate for the touch-control capacitance of each of the plurality of first touch-control electrode blocks 11 in a finite space as much as possible, each of plurality of first touch-control electrode blocks 11 may have a mesh structure, and each of the plurality of touch-control compensation blocks 4 may have a monolithic structure.

For each first touch-control electrode block 11 of the plurality of first touch-control electrode blocks 11 with a mesh structure, since there are openings between grids, its area may be smaller than the corresponding one monolithic touch-control compensation block 4 of the same size. The monolithic shape may have a complete touch-control surface without openings. One monolithic touch-control compensation block 4 can compensate for a larger touch-control capacitance while occupying the same space. Optionally, when the missing area of one first touch-control electrode block 11 of the plurality of first touch-control electrode blocks 11 is large, the corresponding one touch-control compensation block 4 can be used to compensate for it. When the missing area of the first touch-control electrode block 11 is small, it can be compensated by one corresponding touch-control compensation block 4 in a mesh structure. Optionally, the display panel may further include a substrate 8 and a display device layer 9 provided on one side of the substrate. The plurality of first touch-control electrode blocks 11 and the plurality of touch-control compensation blocks 4 may be provided on a side of a light emitting surface of the display device layer 9.

In some embodiments, one of the plurality of touch-control electrode blocks 1 may be a metal mesh, a corresponding one of the plurality of touch-control compensation blocks 4 may specifically have a whole-surface shape. One whole-surface touch-control compensation block 4 may have a larger touch-control surface and can produce a larger touch-control surface. And the plurality of touch-control compensation blocks 4 and the plurality of touch-control electrode blocks 1 may be arranged in the same layer, facilitating the electrical connection between the plurality of touch-control compensation blocks 4 and the plurality of touch-control electrode blocks 1 to realize the touch-control capacitance compensation.

Optionally, when the crack detection line 3 is directly drawn from corresponding one of the plurality of first touch-control electrode blocks 11 that is a metal mesh, since the plurality of touch-control compensation blocks 4 and the plurality of touch-control electrode blocks 1 are arranged in the same layer, it may be necessary to provide a gap in one of the plurality of touch-control compensation blocks 4 corresponding to the corresponding one of the plurality of first touch-control electrode blocks 11 to avoid the crack detection line 3, such that the crack detection line 3 may pass through the gap and extend into the first non-display area NA1.

Optionally, the plurality of touch-control compensation blocks 4 may be located in the first non-display area NA1 to avoid the problem of visible patterns while compensating the electrode blocks.

Figure 12:
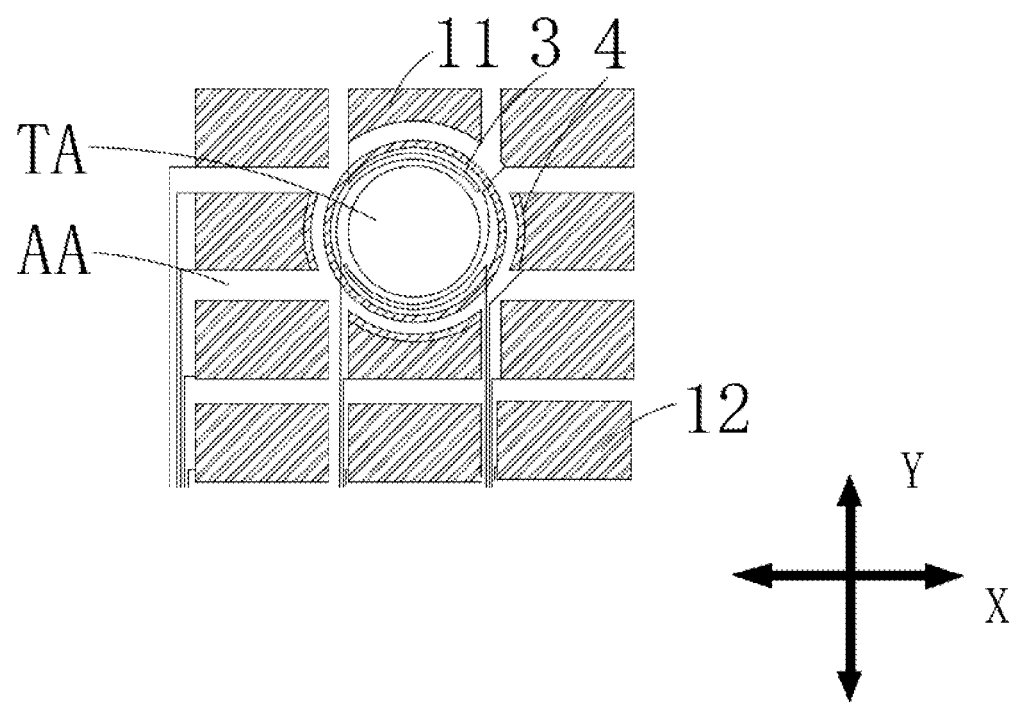
FIG. 12 illustrates an exemplary first touch-control control electrode consistent with various disclosed embodiments in the present disclosure.

In some embodiments shown in FIG. 12, to further compensate for the touch-control capacitance of the plurality of first touch-control electrode blocks 11, the display panel may further include second touch-control electrode blocks 12 surrounding the plurality of first touch-control electrode blocks 11. In a direction perpendicular to a plane where the touch-control electrode layer is located, a projected area of each second touch-control electrode block 12 may be equal, and larger than a projected area of each of the plurality of first touch-control electrode blocks 11. The plurality of first touch-control electrode blocks 11 may include one or more first touch-control electrode blocks 11 with the largest difference in projection area from the second touch-control electrode blocks 12. The at least one touch-control signal line 2 electrically connected to the one or more first touch-control electrode blocks 11 may be multiplexed as the crack detection line 3.

It should be noted that since the first touch-control electrode block 11 needs to be arranged around the functional component area TA, the first touch-control electrode block 11 is missing a part of the second touch-control electrode compared to the second touch-control electrode to match the functional component area TA. The projected area of the touch-control electrode block 12 is larger than the projected area of each first touch-control electrode block 11, that is, the touch-control capacitance of each first touch-control electrode block 11 is smaller than the touch-control capacitance of the second touch-control electrode block 12, due to cracks The detection line 3 is also a conductor and has a certain resistance, so the crack detection line 3 can also perform touch-control capacitance compensation for the first touch-control electrode block 11. Specifically, one or several first touch-control electrode blocks 11 with the largest difference in projection area from the second touch-control electrode block 12 among the plurality of first touch-control electrode blocks 11 may be selected, that is, the first touch-control electrode block 11 with the largest missing area. The touch-control signal line 2 connected to a touch-control electrode block 11 is multiplexed as a crack detection line 3, which realizes the touch-control capacitance compensation of the first touch-control electrode block 11 while realizing crack detection.

To improve the accuracy of crack detection, in some optional embodiments, the functional component area TA may have at least one curved side, and the crack detection line 3 adjacent to the at least one curved side of the functional component area TA may have an extension path that matches the at least one curved side. Optionally, when the functional component area TA is circular, the crack detection line 3 may form a circular ring structure, to match the curved edge of the functional component area TA and perform detection on various positions where cracks may appear on the edge of the functional component area TA.

Figure 13:
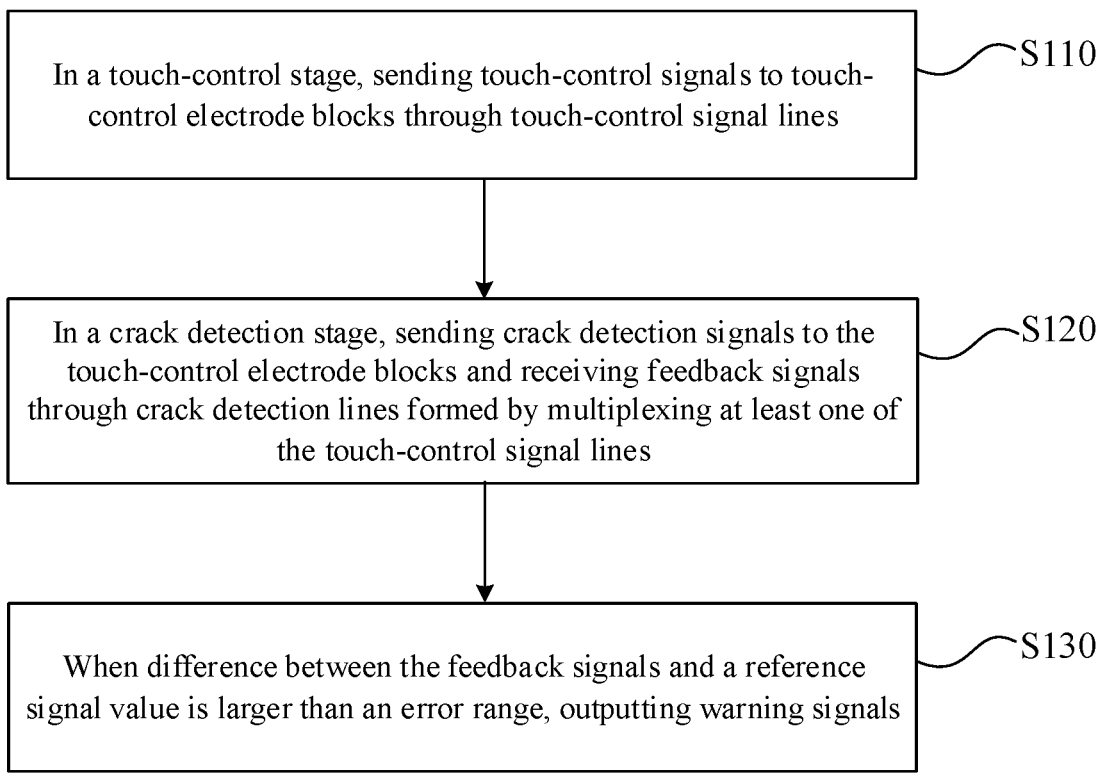
FIG. 13 illustrates an exemplary driving method of a display panel consistent with various disclosed embodiments in the present disclosure.

As shown in FIG. 13, the present disclosure also provides a driving method for a display panel. The method may include:

S110: sending touch-control signals to the plurality of touch-control electrode blocks 1 through the touch-control signal lines 2 in a touch-control stage;

S120: sending crack detection signals to the plurality of touch-control electrode blocks 1 through the crack detection line 3 formed by multiplexing at least one of the touch-control signal lines 2 and receiving feedback signals in a crack detection stage; and S130: when difference between the feedback signals and reference signal values is larger than an error range, outputting warning signals.

In S110, the touch-control signals may be sent to each of the plurality of touch-control electrode blocks 1 by the control chip 6, to achieve the touch-control function of the display panel.

In S120, the crack detection signals may be sent to the plurality of touch-control electrode blocks 1 and the feedback signals may be received by the crack detection component 5 integrated into the control chip 6. In some embodiments, to simplify the signal transmission, the touch-control signals may be multiplexed as the crack detection signals. That is, the touch-control signals of the plurality of touch-control electrode blocks 1 and the sensing signals fed back by the plurality of touch-control electrode blocks 1 may be used to determine whether the cracks occur. It may be unnecessary to send the crack detection signals.

In S130, when the difference between the feedback signals and the reference signal values is larger than the error range, the warning signals may be output. The error range may be configured according to actual conditions, and may specifically be a voltage range or a capacitance range.

In the present disclosure, a portion of the touch-control signal lines 2 may be multiplexed as the crack detection line 3, and the touch-control function and the crack detection function of the display panel may be achieved simultaneously. Extra wiring for crack detection may be avoided, and the influence of the crack detection line 3 on the touch-control signal may be reduced. The integration level and the space utilization of the display panel may be improved simultaneously.

In some embodiments, the feedback signals may include voltage values of the plurality of touch-control electrode blocks 1 after receiving the crack detection signals. When the crack detection line 3 has a crack, its resistance will change, which in turn affects the voltage values of the plurality of touch-control electrode blocks 1 connected to the crack detection line 3. For example, when the crack detection line 3 is completely broken, that is, the crack detection line 3 and the plurality of touch-control electrode blocks 1 connected to it are in an open state, there may be no feedback signals. It can also be understood that the feedback signals may be zero. The warning signals may be output to remind workers that the display panel is cracked.

Figure 14:
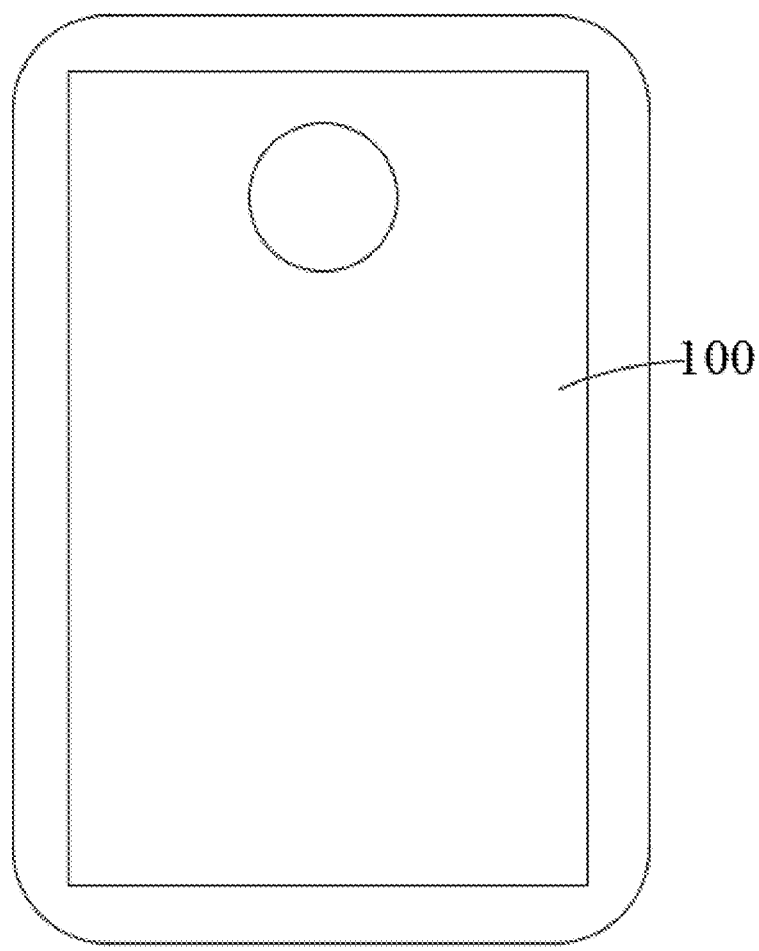
FIG. 14 illustrates an exemplary display device consistent with various disclosed embodiments in the present disclosure.

As shown in FIG. 14, the present disclosure also provides a display device. The display device may include a display panel 100. The display panel 100 may be any display panel provided by various embodiments of the present disclosure. The display device provided by the embodiments of the present disclosure may have the technical effect of the technical solution of the display panels in any of the foregoing embodiments, and the explanation of the structure and terms that are the same as or corresponding to the foregoing embodiments will not be repeated here. The display device provided by the embodiments of the present disclosure may be a mobile phone or any electronic product with a display function, including but not limited to following categories: televisions, notebook computers, desktop displays, tablet computers, digital cameras, smart bracelets, smart glasses, on-board displays, medical equipment, industrial control equipment, touch-control interactive terminals, etc., which are not particularly limited in the embodiments of the present disclosure.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising a functional component area, a display area at least partially surrounding the functional component area, a first non-display area between the functional component area and the display area, a second non-display area at least partially surrounding the display area, a touch-control electrode layer, and touch-control signal lines,
  wherein:
  the touch-control electrode layer includes a plurality of touch-control electrode blocks, and at least one, of the plurality of touch-control electrode blocks, surrounding the functional component area has a missing part and is electrically connected to an adjacent control compensation block configured to compensate for the missing part of a touch-control capacitance in the at least one touch-control electrode block;
  the touch-control signal lines are electrically connected to the plurality of touch-control electrode blocks correspondingly;
  at least one touch-control signal line of the touch-control signal lines is multiplexed as one or more crack detection lines; and
  at least a portion of the one or more crack detection lines is located in the first non-display area and partially surrounding the functional component area.

2. The display panel according to claim 1, wherein:
  the plurality of touch-control electrode blocks includes a plurality of first touch-control electrode blocks;
  at least one edge of each of the plurality of first touch-control electrode blocks is disposed adjacent to the functional component area; and
  at least one touch-control signal line of touch-control signal lines that are electrically connected to the plurality of first touch-control electrode blocks is multiplexed as the one or more crack detection lines.

3. The display panel according to claim 2, further including a crack detection circuit, wherein:
  the crack detection circuit includes a crack detection component and the one or more crack detection lines are electrically connected to the crack detection component; and
  the crack detection component is disposed in the second non-display area.

4. The display panel according to claim 2, further including a control chip, wherein:
  the control chip is disposed at a side of a first direction of the functional component area;
  each of the touch-control signal lines is electrically connected to the control chip respectively;
  in the first direction, the plurality of first touch-control electrode blocks includes first A touch-control electrode blocks disposed at a side of the functional component area away from the control chip; and
  at least one touch-control signal line electrically connected to the first A touch-control electrode blocks is multiplexed as the one or more crack detection lines.

5. The display panel according to claim 2, further including a control chip, wherein:
  the control chip is disposed at a side of a first direction of the functional component area;
  each of the touch-control signal lines is electrically connected to the control chip respectively;
  in the first direction, the plurality of first touch-control electrode blocks includes first B touch-control electrode blocks disposed at a side of the functional component area adjacent to the control chip; and
  at least one touch-control signal line electrically connected to the first B touch-control electrode blocks is multiplexed as the crack detection line.

6. The display panel according to claim 2, wherein:
  when a number of the plurality of first touch-control electrode blocks is less than or equal to 4, one touch-control signal line of the plurality of touch-control signal lines is multiplexed as the one or more crack detection lines; and/or
  when the number of the plurality of first touch-control electrode blocks is greater than 4, at least two touch-control signal lines of the touch-control signal lines are multiplexed as the one or more crack detection lines.

7. The display panel according to claim 2, wherein:
  one of the one or more crack detection lines encircles at least two circles in a direction radiating to the display area from a center of the functional component area.

8. The display panel according to claim 2, wherein:
at least two touch-control signal lines of the touch-control signal lines are multiplexed as the one or more crack detection lines; and
adjacent two of the one or more crack detection lines do not overlap in the direction radiating to the display area from a center of the functional component area.

9. The display panel according to claim 2, wherein a number of the one or more crack detection lines is larger than or equal to 2, and the one or more crack detection lines are disposed symmetrically with respect to the center of the functional component area.

10. The display panel according to claim 2, wherein:
the first non-display area includes a dam part surrounding the functional component area; and
at least a portion of the one or more crack detection lines is disposed between the dam part and the functional component area.

11. The display panel according to claim 10, wherein:
each crack detection line of the one or more crack detection lines includes a first detection section, a second detection section, and a third detection section connected to each other;
the first detection section is disposed at a side of the dam part away from the functional component area, and is partially tangent to an outer edge of the dam part;
the second detection section passes through the dam part; and
the third detection section is disposed at another side of the dam part close to the functional component area, and is partially tangent to an inner edge of the dam part.

12. The display panel according to claim 11, wherein:
a line width of the second detection section is larger than a line width of the first detection section and a line width of the third detection section.

13. The display panel according to claim 10, further including a plurality of touch-control compensation blocks disposed between the dam part and the plurality of first touch-control electrode blocks, wherein:
the plurality touch-control compensation blocks are disposed at intervals; and
each of the plurality touch-control compensation blocks is electrically connected an adjacent first touch-control electrode block of the plurality of first touch-control electrode blocks.

14. The display panel according to claim 13, wherein:
at least one of the touch-control signal lines extends toward the functional component area through intervals between the plurality touch-control compensation blocks, to form the one or more crack detection lines.

15. The display panel according to claim 13, wherein:
at least one of the touch-control signal lines extends toward the functional component area from the plurality touch-control compensation blocks, to form the crack detection lines.

16. The display panel according to claim 13, wherein:
each of the plurality of touch-control compensation blocks has a curved edge facing the functional component area; and
at least one of the touch signal lines extends from an extension line of the curved edge toward the functional component area to form the one or more crack detection lines.

17. The display panel according to claim 13, wherein:
each of the plurality of first touch-control electrode blocks has a mesh structure; and
each of the plurality of touch-control compensation blocks has a monolithic structure.

18. The display panel according to claim 2, further including second touch-control electrode blocks surrounding the plurality of first touch-control electrode blocks, wherein:
in a direction perpendicular to a plane of the touch electrode layer is, a projected area of each of the second touch electrode blocks is larger than a projection area of each of the plurality of first touch-control electrode blocks;
the plurality of first touch-control electrode blocks includes one or more first touch-control electrode blocks with a maximum difference in the projection area from the second touch-control electrode blocks; and
touch-control signal lines electrically connected to the one or more first touch-control electrode blocks are multiplexed as the one or more crack detection lines.

19. The display panel according to claim 1, wherein:
the functional component area has at least one curved edge; and
the one or more crack detection lines adjacent to the at least one curved edge of the functional component area have extension paths matching the at least one curved edge.

20. A driving method of a display panel, comprising:
in a touch-control stage, sending touch-control signals to touch-control electrode blocks through touch-control signal lines, wherein at least one of the touch-control electrode blocks has a missing part and is electrically connected to an adjacent control compensation block configured to compensate for the missing part of a touch-control capacitance in the at least one touch-control electrode block;
in a crack detection stage, sending crack detection signals to the touch-control electrode blocks and receiving feedback signals through the one or more crack detection lines formed by multiplexing at least one of the touch-control signal lines; and
when difference between the feedback signals and a reference signal value is larger than an error range, outputting warning signals.

21. A display panel, comprising a functional component area, a display area at least partially surrounding the functional component area, a first non-display area between the functional component area and the display area, a second non-display area at least partially surrounding the display area, a touch-control structure including a touch-control electrode layer and touch-control signal lines,
wherein:
the touch-control structure is a self-capacitance touch-control structure;
the touch-control electrode layer includes a plurality of touch-control electrode blocks;
the touch-control signal lines are electrically connected to the plurality of touch-control electrode blocks correspondingly;
at least one touch-control signal line of the touch-control signal lines is multiplexed as one or more crack detection lines; and
at least a portion of the one or more crack detection lines is located in the first non-display area and partially surrounding the functional component area.

22. The display panel of claim 21, a touch-control electrode block is connected to a control module through a respective touch-control signal line.

23. The display panel of claim 21, wherein the touch-control signal lines and the plurality of touch-control electrode blocks are disposed in a same layer.

* * * * *